United States Patent [19]

Jackson et al.

[11] 4,189,903
[45] Feb. 26, 1980

[54] ROTARY LAWN MOWER WITH REMOVABLE MULCHING ATTACHMENT

[75] Inventors: Harold P. Jackson; Richard W. Rhinehart, both of McDonough, Ga.

[73] Assignee: McDonough Power Equipment, Division of Fuqua Industries, Inc., McDonough, Ga.

[21] Appl. No.: 918,608

[22] Filed: Jun. 23, 1978

[51] Int. Cl.² ............................................. A01D 55/18
[52] U.S. Cl. ........................................ 56/255; 56/17.5; 56/295
[58] Field of Search ...................... 56/10.5, 11.9, 13.4, 56/13.6, 13.7, 13.8, 17.4, 17.5, 255, 295, 320.1, 320.2

[56] References Cited

U.S. PATENT DOCUMENTS

| | | | |
|---|---|---|---|
| 2,734,327 | 2/1956 | Whitney | 56/13.8 |
| 2,786,318 | 3/1957 | Caldwell et al. | 56/13.7 |
| 2,836,024 | 5/1958 | Davis et al. | 56/13.7 |
| 3,299,622 | 1/1967 | Hanson et al. | 56/17.5 |
| 3,531,923 | 10/1970 | DeLay | 56/12.8 |
| 3,538,692 | 11/1970 | Cope et al. | 56/295 |
| 3,797,212 | 3/1974 | Pursel | 56/255 |

FOREIGN PATENT DOCUMENTS 164542  8/1955  Australia ................... 56/11.8

Primary Examiner—Russell R. Kinsey
Attorney, Agent, or Firm—William E. Mouzavires

[57] ABSTRACT

A rotary lawn mower apparatus including a mower housing and an annular mulching liner attachment mounted within the mower housing and extending above the rotating cutter blade. The mulching liner includes integrally formed guide vanes for directing the clippings inwardly toward the center of the mower housing where they pass downwardly through the plane of the rotating cutter blade to be finely mulched and propelled below the cutting plane onto the ground for maximum mulching efficiency.

28 Claims, 15 Drawing Figures

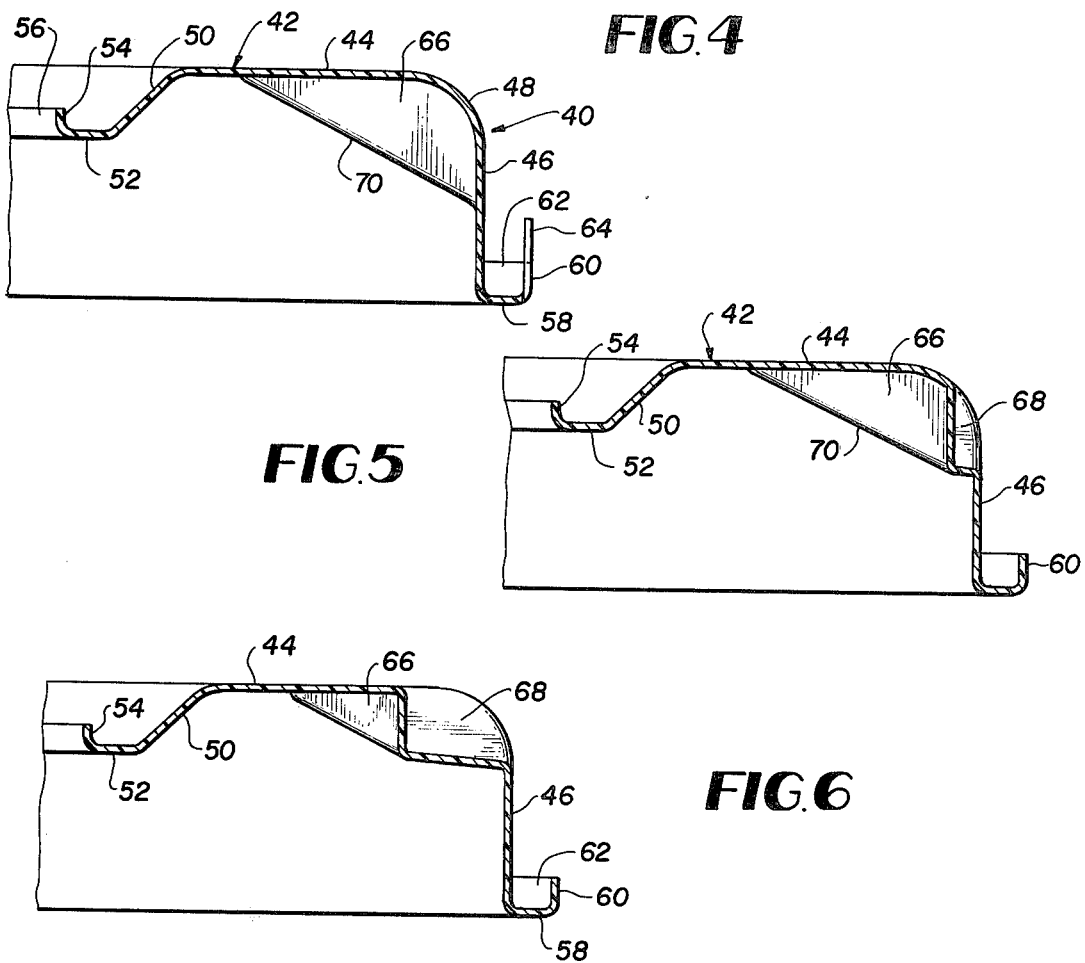
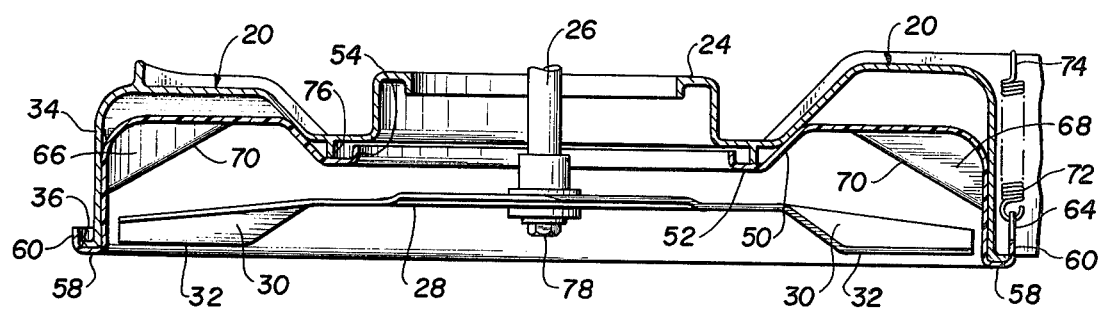

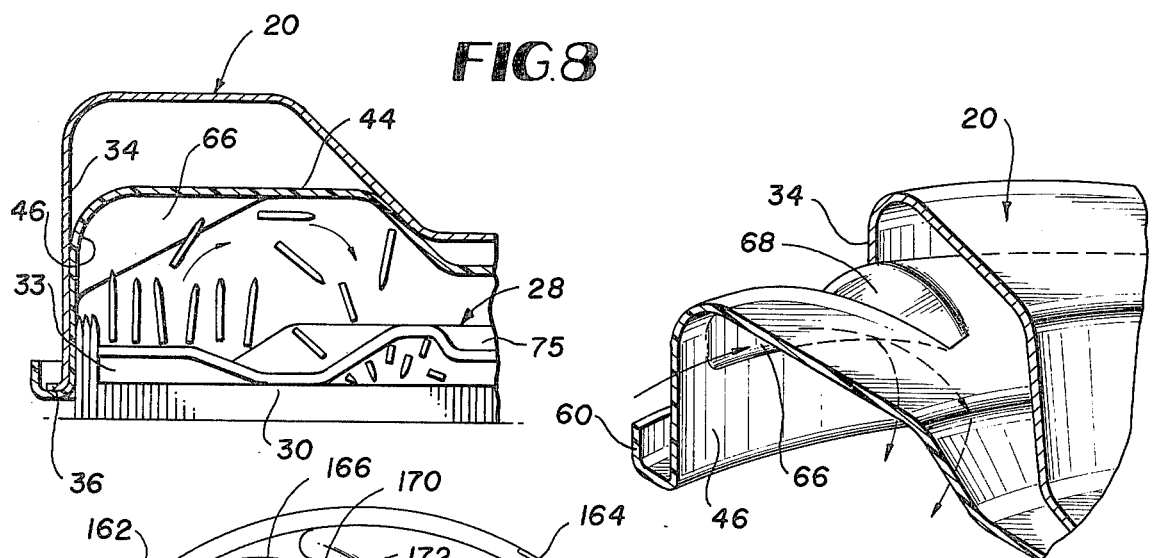
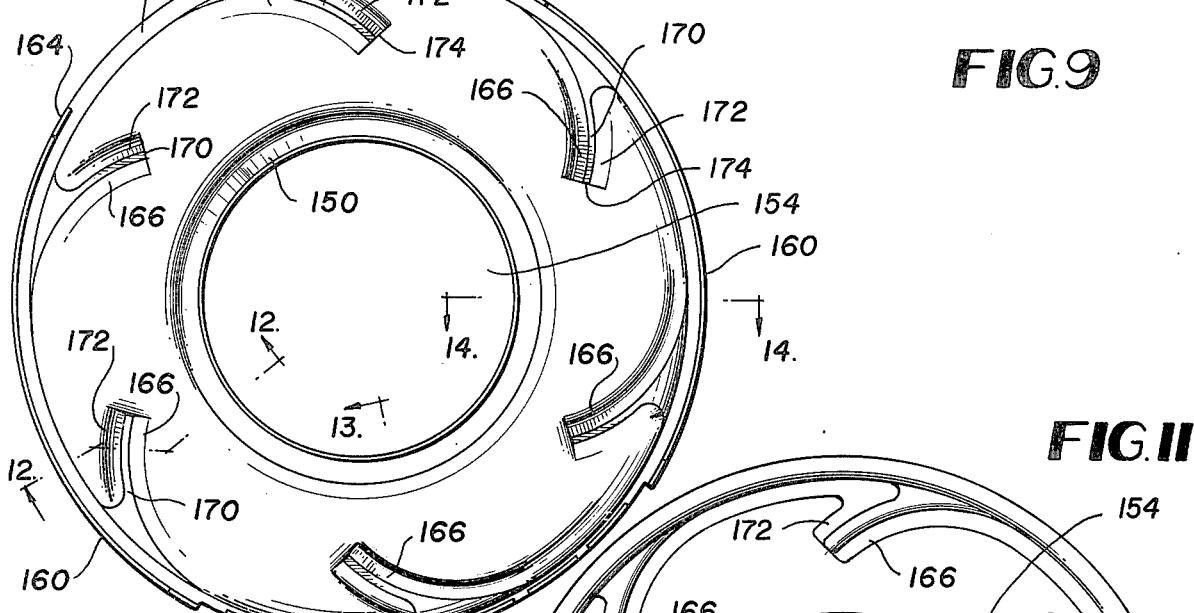
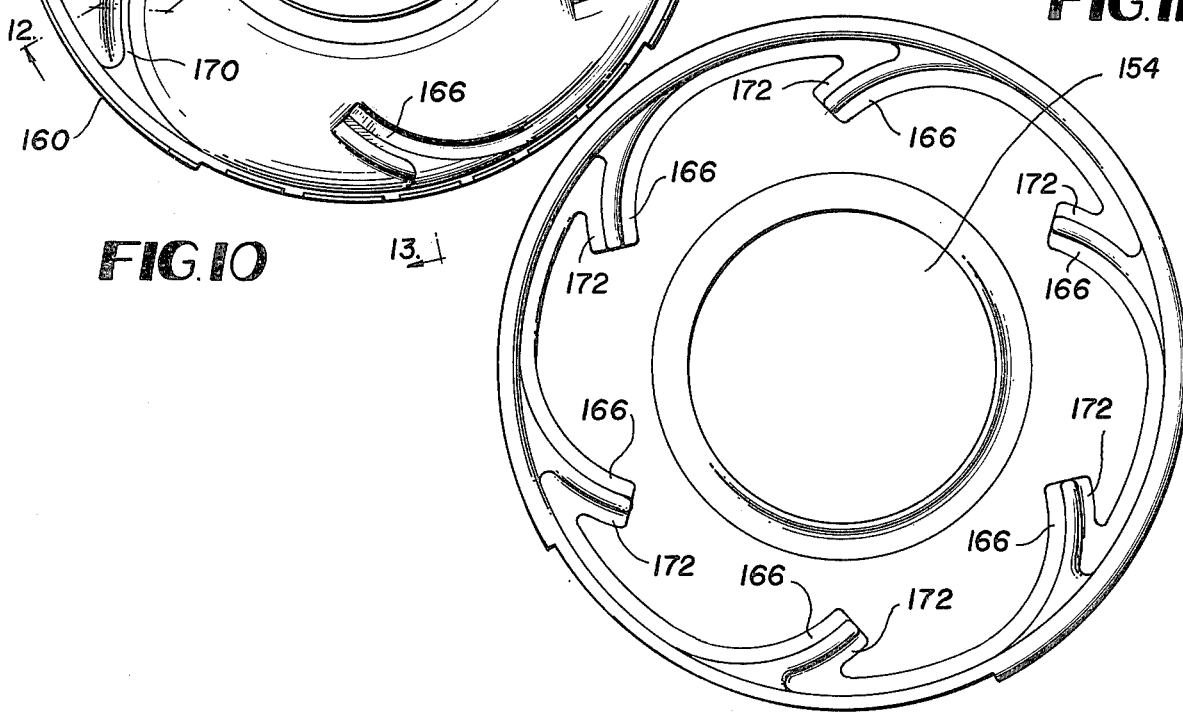

ROTARY LAWN MOWER WITH REMOVABLE MULCHING ATTACHMENT

BACKGROUND OF INVENTION

1. Field of the Invention

This invention relates to rotary lawn mowers, and more particularly to an improved rotary lawn mower including a housing having a mulching liner, and to an improved mulching liner for rotary lawn mowers.

2. Description of the Prior Art

In the past, the majority of rotary lawn mowers have been of the type having a discharge chute formed either in the downwardly depending side wall or skirt of the mower housing or in the peripheral edge portion of the housing top wall, or both, for discharging the clippings. The configuration of the housing and of the rotary cutter blade were such as to create a relatively high-velocity air flow from beneath the housing to entrain the clippings and to discharge them with sufficient velocity either to deposit the clippings in a bag carried on or behind the mower, or to distribute the clippings some distance from the mower. Such mowers are sometimes hereinafter referred to generally as bagging mowers whether or not the mower employs a clippings bag.

Lawn mowers are also known in which the housing has no top or peripheral discharge chute so that the clippings are deposited back onto the lawn beneath the housing as the mower progresses along its path. Such mowers are generally known as mulching mowers and are designed to disintegrate or chop the clippings as finely as possible to enable them to more readily sift downward through the standing grass to the ground so that raking is not required. Once the finely chopped clippings reach the ground, they quickly decompose, or mulch, providing natural fertilizer for the growing plants. Such mulching mowers eliminate the well-known and troublesome problem of disposing of grass clippings collected in the bag of a conventional mower, or raked-up following mowing when a bag is not used.

While there are both economic and ecological reasons for mulching and returning grass clippings to the ground, there are times when it is inconvenient or undesirable to do so. For example, when grass is unusually high and thick, as after a prolonged rainy season, or when the grass has not been mowed for an extended period, the quantity of clippings may be too great to sift through to the ground. Also, in periods of extremely fast growth such as in the spring, the accumulation of mulch on the ground can be so rapid as to build up to the point of choking out new grass plants, or to create conditions favorable to harmful insects or disease. Thus, it may be desirable to collect the clippings at times and to mulch them at other times.

Various attempts have been made in the past to convert conventional rotary lawn mowers to mulching mowers as, for example, by providing means for covering or blocking the discharge chute in the mower housing. However, these attempts have not been entirely successful since the housing of bagging mowers are conventionally designed to create maximum air velocity within the housing to facilitate discharge of the clippings. Blocking the discharge chute of such mowers does not result in effective mulching but rather tends to clog the mower housing and to leave the clippings in unsightly clumps deposited on top of the standing grass.

It also has been proposed to convert a bagging mower to a mulching mower by the use of removable cutter blades or the like mounted within the mower housing, and one such device is illustrated in U.S. Pat. No. 3,797,214. However, this patent teaches that the conventional clipping discharge chute should be provided so that the clippings, which are chopped on the sharp edges of the fixed blades within the housing, are then discharged and distributed via the chute. Such devices have a tendency to clog and generally are ineffective.

The various attempts to convert conventional bagging type lawn mowers to mulching mowers have not met with widespread acceptance with the result that the average homeowner must take a choice between a bagging mower and a mulching mower, or alternatively to buy one of each.

In view of the above it is a primary object of the present invention to provide an improved lawn mowing apparatus which is readily convertible between a conventional bagging mower and an effective mulching mower.

Another object of the invention is to provide such a mowing apparatus which can be readily and easily converted between a bagging and a mulching mower by unskilled persons and without requiring special tools.

Another object of the invention is to provide an improved mulching attachment for a bagging type lawn mower, which attachment will provide effective mulching and efficient distribution of the mulched clippings with a minimum of clogging of the mowing apparatus.

A further object is to provide an improved lawn mower having a rigid mower housing and an improved mulching liner mounted beneath the housing for directing grass clippings inwardly from the periphery of the housing and downwardly through the plane of the rotating blade.

SUMMARY OF THE INVENTION

The foregoing and other objects and advantages of the invention are attained in accordance with one embodiment in which a conventional bagging lawn mower is provided with a removable mulching liner for the mower housing, with the liner being quickly and easily mountable within the mower housing and extending above the plane of the rotating cutter blade. The mulching liner preferably is a thin-walled, ring-shaped structure having an outer generally cylindrical skirt adapted to fit within and closely conform to the inner surface of the side wall of the housing, and a top panel including a substantially horizontal body portion extending inward from the skirt. An integrally formed, inwardly inclined or curved transition portion preferably joins the body and skirt portions to provide a substantially smooth, continuous surface between the skirt and top panel. The top panel terminates at its inner periphery in a central hub portion offset downwardly slightly from the body portion and joined thereto by a generally conical portion of the central hub, with the hub portion being in position to rest firmly against a downwardly directed surface on the central portion of the housing beneath the conventional engine mount.

A plurality of guide vanes are integrally formed in the mulching liner at spaced intervals around its periphery. The guide vanes spiral inwardly from the skirt, in the direction of rotation of the mower blade, and are positioned and dimensioned to deflect clippings, inwardly toward the center of the mower housing. The clippings then pass down through the path of a special mulching cutter blade to be further disintegrated. The spiral configuration of the guide vanes presents minimum interference to movement of the air and clippings while effectively directing them inwardly toward the center of the mower. The air stream is then deflected downwardly by the hub of the liner and drawn down by a reverse airfoil on the central portion of the mulching blade to drive the clippings through the plane of the blade and into the standing grass beneath the mower. The mulching blade is sharpened along a substantial portion of its leading edge so that the clippings are chopped, or mulched as they pass through the plane of the blade.

Quick release connecting means are provided for attaching the mulching liner beneath the mower housing. In one embodiment, the connecting means is in the form of resilient spring clips so that the only tools required for installing and removing the mulching liner are the tools normally required for attaching or removing the mower blade.

The mulching liner according to the invention can also be employed as a removable or permanent attachment for mulching type rotary mowers having no discharge chute outlet.

BRIEF DESCRIPTION OF THE DRAWINGS

Other objects and advantages of the invention will become apparent from the following detailed description, taken in conjunction with the drawings in which:

FIG. 4 is an enlarged fragmentary sectional view taken on line 4—4 of FIG. 2;

FIG. 5 is an enlarged fragmentary sectional view taken on line 5—5 of FIG. 2;

FIG. 6 is an enlarged fragmentary sectional view taken on line 6—6 of FIG. 2;

FIG. 7 is an enlarged sectional view taken on line 7—7 of FIG. 1;

FIG. 8 is a further enlargement of a portion of the structure shown in FIG. 7 and illustrating the use of the mower to mulch grass clippings;

FIG. 9 is a fragmentary sectional view, in perspective, of a portion of the structure shown in FIG. 8;

FIG. 10 is a top plan view similar to FIG. 2, and showing an alternate embodiment of the mulching liner;

FIG. 11 is a bottom plan view of the mulching liner shown in FIG. 10;

DESCRIPTION OF THE PREFERRED EMBODIMENTS

Figure 1:
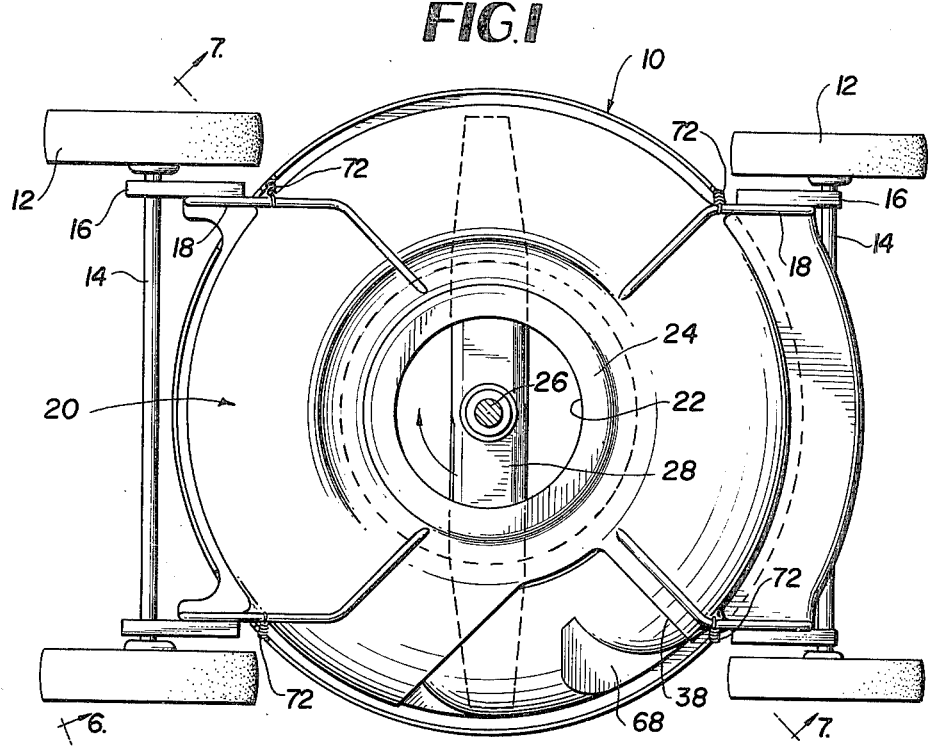
FIG. 1 is a top plan view of a rotary lawn mower embodying the invention, with certain parts removed and others broken away, to more clearly illustrate the invention.
Figure 2:
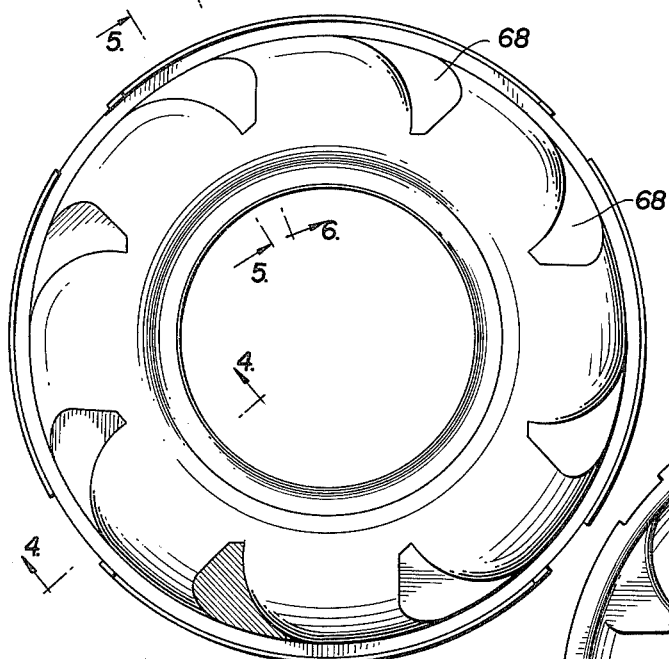
FIG. 2 is a top plan view of a mulching liner employed in the lawn mower shown in FIG. 1.
Figure 3:
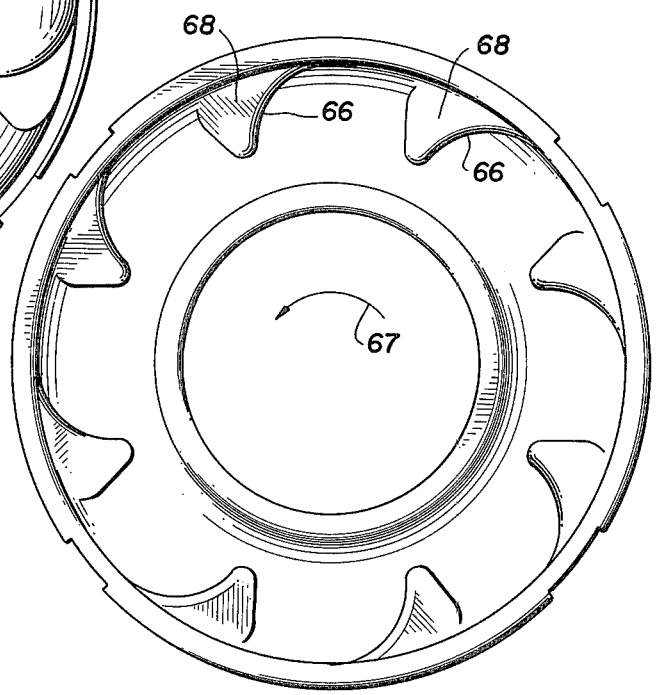
FIG. 3 is a bottom plan view of the mulching liner as shown in FIG. 2.

Referring now to the drawings, in detail, FIG. 1 shows a rotary power lawn mower of the general type ilulstrated in U.S. Pat. No. 3,538,421 and embodying the present invention. The lawn mower includes a generally circular blade or mower housing 10 typically supported at its front and rear ends by wheels 12 rotatably mounted on axles 14 to roll over the ground with the bottom edge of the housing spaced above the ground. Axles 14 may extend continuously across the housing and be adjustably suspended from the housing by bell cranks designated generally at 16 and which are pivotally mounted to support brackets 18 on the side portions of the housing 10.

In power mowers of this general type, the mower housing 10 typically includes a top wall 20 having a central opening 22 around which extends a hub or platform 24 for supporting a drive motor (not shown) to drive a vertical shaft 26 extending downwardly through opening 22. The conventional cutter blade (normally rigidly but removably attached to the distal end of shaft 26 for rotation in a plane generally parallel to the ground surface supporting the mower) is preferably replaced with a mulching blade 28 shown schematically in FIGS. 1 and 7 and in detail in FIGS. 8 and 15. Mulching blade 28 preferably includes a generally horizontal central body 29 and downwardly offset end portions 30, with the leading edges 32 of the end portion being sharpened, and the trailing edge 33 being turned upwardly to produce an impeller action creating an updraft lifting the grass to be cut and generating a relatively high-velocity flow of air around the interior of the housing in the direction of rotation of the blade. Sharpened edge 32 preferably extends inwardly from end portion 30 and along the body of the blade a substantial distance for reasons discussed below.

Housing 10 terminates at its outer periphery in a generally vertical substantially cylindrical downwardly depending side wall 34 which surrounds the path of the cutter blade with the ends of the blade spaced slightly inward and slightly above the bottom edge 36 of the side wall. The height of the side wall 34 is made sufficient to insure adequate space between the plane of the blade and the top wall 20 to permit grass clippings to flow around the housing above the blade and outwardly through a discharge opening 38 formed in the side wall 34 and the adjacent edge portion of the top wall 20. In conventional operation of the mower wherein the clippings are discharged from beneath the housing through the opening 38, a guide chute (not shown) is fitted within the opening to direct the clippings outwardly in a relatively confined, high-velocity stream. Such chutes normally have provisions for attachment of a bag for collecting the clippings when it is desired to do so. The guide chute may be separately formed and releasably attached to the housing 10, or alternatively, portions of the chute may be integrally formed with the housing, as is well known in the art.

The portion of the top wall 20 between the hub 24 and side wall 34 is generally of compound-curve configuration and may vary in height around the housing commencing with a low point extending from the back portion of the discharge opening 38 to the rear portion of the housing, then gradually increasing to a maximum height at the front or leading edge of the discharge opening 38. Such a contour arrangement facilitates the lifting or vacuum action of the rotating cutter blade while, at the same time, effectively preventing the air current and entrained clippings from circulating in a continuous path around the interior of the housing by directing and guiding the stream of air and clippings out through the discharge opening.

The high suction or lifting action produced by a conventional cutter blade rotating at high speed in the mower housing construction described inherently results in a minimum of chopping or mulching of the clippings which are promptly blown out through the discharge opening, and attempts to convert such mowers to mulching mowers by blocking the discharge opening have not been effective as explained above.

In accordance with the present invention, a second housing member, or liner 40 is removably mounted within the housing 10 to convert the mower from a conventional bagging mower to an efficient mulching power. The mulching liner 40 is a thin-walled, ring-shaped structure preferably formed from a single mass of material as by stamping from sheet metal or molding from synthetic resin material such as a thermosetting or thermoplastic polymeric material which, if desired may be reinforced as by glass fibers. The liner 40 includes a top panel 42 having a generally flat body portion 44, and a substantially circular downwardly depending skirt 46 integrally joined with the top panel by an inwardly curved or inclined transition portion 48. An inwardly and downwardly inclined, generally frusto-conical transition portion 50 connects the inner periphery of the flat body portion 44 with a substantially flat ledge 52 which underlies the inner portion of the top wall 20 of the mower housing when the liner is installed as described below. Ledge 52 terminates at its inner periphery in an upturned flange 54 which defines a central opening 56 in the liner.

In the embodiment of the invention illustrated in FIGS. 1 through 9, skirt 46 terminates at its bottom edge in an outwardly directed flange 58 having an upturned rim portion 60 which, together with the bottom portion of the skirt 46, defines an upwardly open, generally U-shaped channel 62 extending around the outer bottom periphery of the liner which is adapted to receive and encompass the bottom edge 36 of the side wall 34 of the mower housing. A plurality of upwardly directed tabs 64 are formed on the rim 60 at spaced intervals there around for mounting the liner as pointed out hereinbelow.

A plurality of substantially vertical guide vanes 66 are integrally formed with and project downwardly from the body portion 44 of the top panel 42. In the embodiment of FIGS. 1 through 9, the guide vanes 66 are substantially rectangular in vertical projection as described hereinbelow. As best seen in FIG. 4, the triangular vanes 66 have a maximum vertical height adjacent the skirt 46, with the height decreasing to substantially zero at a point on the body portion 44 spaced radially inward a substantial distance from the skirt. The guide vanes 66 are substantially tangent to the skirt 46 at their radially outer end and spiral inwardly in the direction of rotation of blade 28 (indicated by arrow 67) in a smooth curve along body portion 44 a distance at least equal to and preferably greater than the full length of the downwardly offset end portion 30 of mulching blade 28 so that air currents created by the rotating blade, and clippings carried in the air currents, will be guided in toward the center of the mower, then back down through the plane of the cutter blade.

An inclined, substantially flat wall 68 extends from the bottom edge 70 of guide vanes 66 upwardly to the plane of the body portion 44 of the top panel, with the panels 68 making a relatively small angle with the plane of the body section 44. The walls 68 reinforce the guide vanes 66 and substantially reduce turbulence on the trailing edge of the guide vanes to produce a smoother, more uniform air-flow within the liner, this configuration also reduces the tendency of dirt, clippings, and the like to adhere to and build up on the liner behind the guide vanes. This, in combination with the inwardly inclined or curved transition 48 between the skirt 46 and the body section 44, enables the scouring action of the high-velocity air and clippings to minimize deposits on the liner and to maintain a uniform flow over the smooth surface of the underside of the liner to facilitate the up-in-and-down flow of the clippings as illustrated in FIG. 8.

The guide vanes 66 and backing walls 68 are preferably integrally formed with the top panel 42 and peripheral skirt 46 by molding or die-forming operations. This not only produces an increased strength and dimensional stability for the overall structure, but also minimizes surface discontinuities and eliminates the necessity for separate fasteners to secure the guide vanes in position.

Referring now to FIGS. 1 and 7, the mulching liner 40 is illustrated as installed on a commercially available mower of the type described above, with the liner retained in position by a plurality of coil springs 72 each having one end attached to one of the upstanding tabs 64. Springs 72 have hooks 74 on their free ends with the hooks being adapted to project over and be retained by the brackets 18 so that tension in the springs 72 firmly, but releasably, retain the bottom flange 58 in contact with the bottom edge 36 of the side wall 34. Preferably, at the same time, the outer conical surface of transition portion 50 of top panel 42 is also in contact with a downwardly directed surface on the top wall 20 of the mower housing with the upturned flange 54 engaging or being closely spaced from the bottom surface of the top wall. A downwardly directed reinforcing lip 76, commonly formed on the undersurface of a mower housing and surrounding the engine mounting hub 24, can engage the upwardly directed surface of the ledge 50. In this position, the housing is firmly retained against rotation, both by frictional contact between the liner and housing, and by the tensile force exerted by the spring clips 72. However, since the mulching liner is substantially symmetrical, exact positioning within the mower housing is not critical so that installation by unskilled persons is easily accomplished.

In order to install the mulching liner in a conventional lawn mower, it is only necessary to remove the conventional cutter blade by removal of the retaining bolt 78 shown in FIG. 7. The mulching liner 40 may then be easily telescoped into position within the mower housing, and springs 72 extended to engage the hooks 74 over the support brackets 18 or other suitable retaining means on the housing. Mulching blade 28 is then installed by use of bolt 78 and the apparatus is ready for use as a mulching mower.

Figure 15:
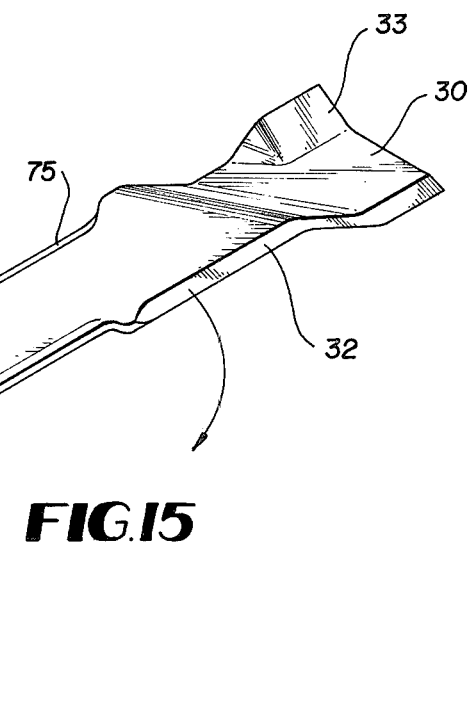

As illustrated by the arrows in FIGS. 8 and 9, grass clippings cut by the end portions of sharpened cutting edge 32 of blade 28 are thrown upwardly by the inclined trailing edge 33 and simultaneously entrained in the highvelocity flow of air around the periphery of the housing liner. The air and entrained clippings engage the guide vanes 66 and are directed inwardly over the substantially flat, generally horizontal body portion 44 of the top panel 42 toward the generally conical transition portion 50. As is seen in FIG. 15, the trailing edge 75 of the body portion 29 of mulching blade 28 is turned downward in the area beneath the body 42 inwardly of the offset end portions 30 of the blade. This downturned edge 75 produces a downward flow of air tending to draw the clippings down through the plane of the blade. Also, the sharpened edge 32 extends inward to the central mounting portion of the blade 28 so that clippings passing down through the plane of the rotating blade will be chopped to more readily sift down through the standing grass. The downward flow of air in the central portion of the housing also tends to propell the chopped clippings down to the ground to leave the lawn substantially free of visible clippings. Any clippings which reach the conical transition portion 50 of the lines are deflected downward into the path of the blade.

The use of the smooth, curved guide vanes provides a continuous airflow inwardly to carry the clippings over the surface of the mulching liner to avoid clogging of the liner or bunching of the clippings on the lawn. At the same time, the relatively small area of the guide vanes enables some flow of air and clippings around the liner so that mulching can take place completely around the liner.

Referring to FIGS. 10 through 14, an alternate embodiment of the invention is disclosed wherein the liner 140 has an overall configuration similar to that described above with respect to the liner 40, with the principal difference being in the configuration of the inwardly spiralling guide vanes. Thus, liner 140 includes a top panel 142 having a generally flat body portion 144 and a substantially circular downwardly depending skirt 146 integrally joined with the top panel by an inwardly curved or inclined transition portion 148. An inwardly and downwardly inclined, generally frustoconical transition portion 150 connects the inner periphery of the flat body portion 144 with a substantially flat ledge 152 which underlies the inner portion of the top wall 120 of the mower housing when the liner is installed in the manner described above. The inner periphery of ledge 152 defines a central opening 156 in the liner. The skirt 146 terminates at its bottom edge in an outwardly directed flange 158 having an upturned rim portion 160 which, together with the bottom portion of the skirt 146, defines an upwardly open generally U-shaped channel 162 for receiving the bottom edge of the mower housing.

A plurality of substantially vertical guide vanes are integrally formed with and project downwardly from the body portion 144 of the top panel 142. In this embodiment, the guide vanes 166 are substantially rectangular in vertical projection, with the vertical height remaining substantially constant from the skirt to their innermost position. Guide vanes 166 are substantially tangent to the skirt 146 at their radially outer end and spiral inwardly in the direction of rotation of blade 28 in a smooth curve along the body portion 144 for a distance at least substantially equal to and preferably slightly greater than the full length of the downwardly offset end portion 30 of the mulching blade 28 as described above with regard to the embodiment of FIGS. 1 through 9.

Figure 12:
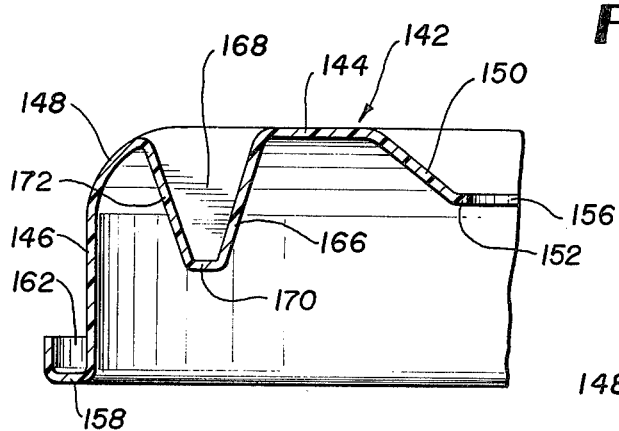
FIG. 12 is an enlarged fragmentary sectional view taken on line 12—12 of FIG. 10.
Figure 13:
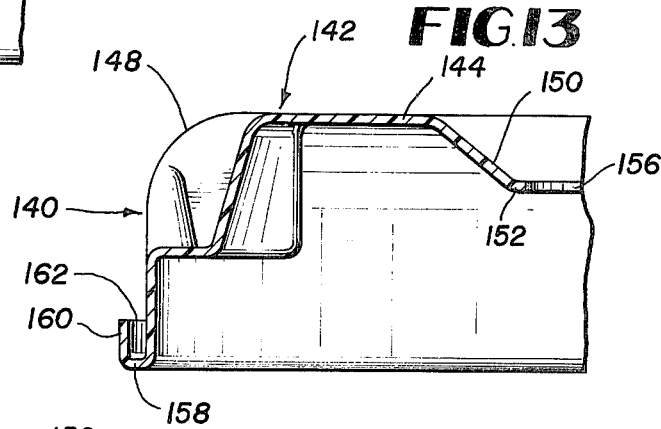
FIG. 13 is an enlarged fragmentary sectional view taken on line 13—13 of FIG. 10.
Figure 14:
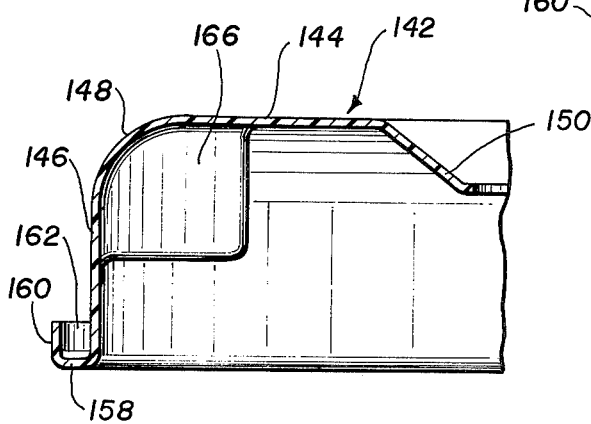
FIG. 14 is an enlarged fragmentary sectional view taken on line 14—14 of FIG. 10; and, FIG. 15 is an isometric view of a mulching blade useful with the invention.

In the embodiment in FIGS. 10 through 14, the guide vanes 166 are integrally molded with the peripheral skirt 146 and body portion 144 of the liner. The guide vanes are formed by molding upwardly open substantially V-shaped grooves or troughs in the body portion 144, with the groove spiralling outward to the outer periphery of the liner. Thus, the individual grooves 168 terminate in a relatively narrow, flat bottom wall 170, with the back wall 172 of the groove extending upwardly to the central panel 144 to reinforce the guide vane 166 defined by the front, or inwardly directed wall of the groove. Thus, as best seen in FIG. 12, the grooves 168 are generally V-shaped in cross section so that the guide vanes 166 and the reinforcing or back wall 172 are slightly inclined rather than being truly vertical. The inner ends of the V-shaped grooves 168 are closed by end walls 174.

Installation of the liner 140 is the same as described with regard to the embodiment of the invention in FIGS. 1 through 9.

While preferred embodiments of the invention have been described, it should be understood that various modifications can be made without departing from the spirit and scope of the invention. Thus, while the mulching liner has been described as a removable liner for use primarily in conversion of a bagging type mower to a mulching mower, such a liner may also be employed as a rigidly fixed or removable mulching liner member in a mower having no discharge chute. For example, a mower housing may be integrally formed as by a drawing or stamping process from sheet metal so as to have a substantially smooth inner surface, and a liner of the general type described herein may then be either removably or rigidly mounted within the housing to thereby provide a relatively inexpensive yet highly efficient mulching mower.

It should be understood, also, that various means for attaching the mulching liner to the mower housing may be provided and that various configurations of the inwardly spiralling guide vanes may be effectively used. Thus, while we have disclosed and described preferred embodiments of our invention, we wish it understood that we do not intend to be restricted solely thereto, but rather that we do intend to include all embodiments thereof which would be apparent to one skilled in the art and which come within the spirit and scope of our invention.

We claim:
1. A rotary lawn mower comprising,
a housing including a top wall and a downwardly depending sidewall, and having a discharge chute opening formed in its peripheral portion,
wheel means supporting the housing for movement over a support surface,
a rotary blade supported for rotation in a plane generally parallel to the supporting surface and spaced below the top wall of the housing, the rotary blade including an airfoil portion for creating a flow of air upwardly and around the inner peripheral portion of the housing from beneath the plane of the blade for lifting the grass to be cut and for conveying the clippings around the housing and outwardly through the discharge chute opening,
drive means for driving said rotary blade,
an annular mulching liner mounted within the housing, said mulching liner including an upwardly extending, substantially circular skirt portion extending in contiguous relation with the inner surface of said sidewall within said housing throughout at least a substantial portion of its circumference, and a top panel extending inwardly from the top of said skirt beneath said top wall and above the path of said rotary blade, said top panel having a central opening extending therethrough,
said drive means including a generally vertical shaft extending downwardly through said housing and said central opening and supporting said rotary blade for rotation in said plane, and attaching means for releasably retaining said mulching liner within said housing with said liner extending over and effectively blocking said discharge chute opening to permit operating the mower as a mulching mower, said attaching means being releasable to permit removal of said mulching liner to enable lawn clippings to be discharged through said chute opening, and wherein said multing liner has guide means for directing clippings inwardly toward said central opening.

2. The invention as defined in claim 1 wherein said guide means comprises a plurality of guide vanes connected with and extending between said skirt and said top panel for directing clippings inwardly toward central opening, said top panel including an annular inwardly and downwardly inclined portion adjacent to said central opening for engaging clippings moving inwardly over the top panel and directing such clippings downwardly toward the plane of said cutter blade.

3. The invention as defined in claim 2 wherein said vanes each have a generally vertical surface spiralling inward from said skirt in the direction of rotation of said rotary blade.

4. The invention as defined in claim 2 wherein said vanes decrease in vertical height from a maximum adjacent said skirt to a minimum at their radially inner end.

5. The invention as defined in claim 2 wherein said vanes are generally rectangular in projection onto a vertical plane.

6. The invention as defined in claim 2 wherein said vanes are integrally formed with said skirt and said top panel of said mulching liner.

7. The invention as defined in claim 2 wherein said mulching liner is integrally molded from a single mass of substantially homogeneous material.

8. The invention as defined in claim 1 further comprises stop means carried on said skirt portion and extending outwardly therefrom in position to engage the bottom of said sidewall for positioning said liner in said housing.

9. The invention as defined in claim 8 wherein said releasable fastener means comprises resilient clip means extending between said liner and said housing for resiliently retaining said stop means in contact with said sidewall.

10. The invention as defined in claim 1 wherein said rotary blade is a mulching blade including a downwardly offset portion at each end, a sharpened leading edge extending from each end inwardly a substantial distance from said offset portions, said airfoil portion comprising an upwardly inclined trailing edge portion on each said offset portion, and a downwardly inclined portion on the trailing edge of the blade inwardly from each said offset portion to create a downward flow of air in the central portion of the housing upon rotation of the blade.

11. A rotary lawn mower comprising, a housing including a top wall and a downwardly depending sidewall, wheel means supporting the housing for movement over a supporting surface, a rotary blade supported for rotation in a plane generally parallel to the supporting surface and spaced below the top wall of the housing, the rotary blade including an airfoil portion for creating a flow of air upwardly and around the inner peripheral portion of the housing from beneath the plane of the blade for lifting the grass to be cut and for conveying the clippings around the housing, drive means for driving said rotary blade, an annular mulching liner mounted within the housing, said mulching liner including, an upwardly extending substantially circular skirt portion extending in contiguous relation with the inner surface of said sidewall within said housing throughout at least a substantial portion of the circumference of said liner, a top panel extending inwardly from the top of said skirt beneath said top wall and above the path of said cutter blade, said top panel having a central opening extending therethrough, and a plurality of guide vanes each having a generally vertical guide surface spiralling inwardly from said skirt in the direction of rotation of said blade, said vanes being rigidly joined with said skirt and said top panel, and said drive means including a generally vertical shaft extending downwardly through said housing and said central opening and supporting said cutter blade.

12. The invention as defined in claim 11 wherein said mulching liner further comprises an annular inwardly and downwardly inclined portion adjacent to said central opening for engaging clippings moving inwardly over the top panel and directing such clippings downwardly toward the plane of said cutter blade.

13. The invention as defined in claim 12 wherein said vanes are generally rectangular in projection onto a vertical plane.

14. The invention as defined in claim 12 wherein said vanes are integrally formed with said skirt and said top panel of said mulching liner.

15. The invention as defined in claim 12 wherein said mulching liner is integrally molded from a single mass of substantially homogeneous material.

16. A mulching attachment for use with a rotary lawn mower of the type having a cutter blade supported on a substantially vertical shaft for rotation in a generally horizontal path beneath a housing including a top wall, a downwardly depending substantially circular sidewall, and a discharge chute opening formed in its peripheral portion, and wherein lawn clippings cut by the rotating blade are normally propelled through the chute opening by air currents created by the rotating blade, said mulching attachment comprising, a ring-shaped housing liner including an annular top panel having a central opening therein and a downwardly depending substantially circular skirt dimensioned to fit within and extend in closely spaced relation to the sidewall of the mower housing throughout at least a substantial portion of its circumference, said top panel including a generally flat, annular body portion extending radially inward from the top of said skirt, and a downwardly inclined portion extending inwardly from the inner periphery of said body portion, said body portion being adapted to underlie the outer peripheral portion of the top wall of the mower housing, said top panel being adapted to engage the top wall of the mower housing inwardly from said body portion, attaching means for releasably securing said liner in position within the mower housing, said liner extending over and blocking the discharge chute when installed in the housing, and wherein said housing liner further includes guide means for directing lawn clippings inwardly towards said central opening.

17. The invention as defined in claim 16 wherein said guide means comprises a plurality of guide vanes extending between the upper portion of said skirt and said body portion of said liner for directing lawn clippings inwardly along said central opening.

18. The invention as defined in claim 17 further comprising liner positioning means on said skirt for engaging the sidewall of a mower housing for vertically positioning said liner in the housing.

19. The invention as defined in claim 17 wherein said liner and said guide vanes are integrally molded from a substantially homogeneous mass of synthetic polymeric material.

20. The invention as defined in claim 17 wherein said attachment means comprises resilient means for connecting said liner in a mower housing, said attachment means being releasable to permit quick installation and removal of said liner.

21. The invention as defined in claim 17 further comprising stop means carried on said skirt portion and extending outwardly therefrom in position to engage the bottom of said sidewall for positioning said liner in said housing.

22. The invention as defined in claim 17 wherein said releasable fastener means comprises resilient clip means extending between said liner and said housing for resiliently retaining said stop means in contact with said sidewall.

23. A mulching attachment for use in a blade housing of a lawn mower of the type having a rotary cutting blade moveable in a generally horizontal plane beneath a top wall of the housing; the attachment including a top panel adapted to be attached in the blade housing to underlie the top wall of the housing and overlie the blade, and means for guiding grass clippings inwardly of the attachment including a plurality of guide vanes located at angularly spaced locations about the top panel and depending from the top panel and extending inwardly from an outer portion of the top panel.

24. The attachment defined in claim 23 wherein said guide vanes extend inwardly along a path curving in a horizontal plane.

25. The attachment defined in claim 23 wherein said guide vanes each have a depth which gradually diminishes in a direction inwardly of the attachment.

26. The attachment defined in claim 23 wherein said guide vanes are generally rectangular in projection into a vertical plane.

27. The attachment as defined in claim 26 wherein said attachment includes an annular peripheral skirt depending from the top panel and wherein said guide vanes extend between the skirt and the top panel.

28. The attachment as defined in claim 27 wherein the attachment including the top panel, skirt and guide vanes are a molded integral structure.

* * * * *